(12) United States Patent
Kuranuki (10) Patent No.: US 12,325,433 B2
(45) Date of Patent: Jun. 10, 2025

(54) FAILURE PREDICTION SYSTEM, FAILURE PREDICTION METHOD, AND FAILURE PREDICTION PROGRAM

(71) Applicant: Panasonic Intellectual Property Management Co., Ltd., Osaka (JP)

(72) Inventor: Masaaki Kuranuki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 120 days.

(21) Appl. No.: 18/546,500

(22) PCT Filed: Feb. 2, 2022

(86) PCT No.: PCT/JP2022/004004
§ 371 (c)(1),
(2) Date: Aug. 15, 2023

(87) PCT Pub. No.: WO2022/176622
PCT Pub. Date: Aug. 25, 2022

(65) Prior Publication Data
US 2024/0116522 A1 Apr. 11, 2024

(30) Foreign Application Priority Data
Feb. 22, 2021 (JP) .................. 2021-026260

(51) Int. Cl.
*G06F 17/00* (2019.01)
*B60W 50/02* (2012.01)

(52) U.S. Cl.
CPC ... *B60W 50/0205* (2013.01); *B60W 2050/021* (2013.01); *B60Y 2200/91* (2013.01); *B60Y 2306/15* (2013.01)

(58) Field of Classification Search
CPC ........ B60W 50/0205; B60W 2050/021; B60Y 2200/91; B60Y 2306/15; B60L 2240/26;
(Continued)

(56) References Cited

U.S. PATENT DOCUMENTS 5,479,379 A * 12/1995 Tsuchiya .................. G04C 3/14
368/80
5,659,472 A * 8/1997 Nishino ............... B62D 5/0487
701/41
(Continued)

FOREIGN PATENT DOCUMENTS

JP 2003-009541 A 1/2003
JP 2009-063555 3/2009
(Continued)

OTHER PUBLICATIONS

Prediction of Electric Vehicle Driving Range and Performance Characteristics (Year: 2023).*
(Continued)

*Primary Examiner* — Ronnie M Mancho
(74) *Attorney, Agent, or Firm* — WHDA, LLP (57) ABSTRACT

An obtainer obtains travel data of an electric vehicle. A predictor predicts a failure due to aging in a drive circuit of a motor which drives a driving wheel of the electric vehicle, based on the travel data of the electric vehicle. The travel data includes position data of the electric vehicle and data relating to power consumption of the electric vehicle. The predictor predicts the failure due to aging in the drive circuit based on a change in an increase of power consumption generated when the electric vehicle travels a same route.

10 Claims, 8 Drawing Sheets

(58) Field of Classification Search
CPC .. B60L 7/18; B60L 58/12; B60L 58/16; B60L 2240/421; B60L 2240/423; B60L 2240/527; B60L 3/12; B60L 2240/12; B60L 2240/427; B60L 2240/429; B60L 2240/529; B60L 2240/622; B60L 2240/70; B60L 2240/80; B60L 2260/44; B60L 2260/50; B60L 2260/54; B60L 3/003; B60L 3/0061; H02M 7/53871; H02M 1/32; G16Y 10/40; G16Y 40/40
USPC .......................................................... 700/29
See application file for complete search history.

(56) References Cited

U.S. PATENT DOCUMENTS

| | | | | |
|---|---|---|---|---|
| 7,467,034 | B2* | 12/2008 | Breed | B60C 23/0408 |
| | | | | 701/29.6 |
| 7,650,210 | B2* | 1/2010 | Breed | G07C 5/008 |
| | | | | 701/31.9 |
| 8,019,501 | B2* | 9/2011 | Breed | H01H 35/146 |
| | | | | 701/31.9 |
| 11,091,196 | B2* | 8/2021 | Kataoka | B62D 5/0463 |
| 2007/0005202 | A1* | 1/2007 | Breed | G07C 5/008 |
| | | | | 714/25 |
| 2009/0043441 | A1* | 2/2009 | Breed | G07C 5/085 |
| | | | | 701/31.9 |
| 2009/0132126 | A1* | 5/2009 | Tamaizumi | B62D 5/0484 |
| | | | | 701/42 |
| 2011/0316346 | A1* | 12/2011 | Porter | G05F 1/67 |
| | | | | 307/151 |
| 2013/0090809 | A1* | 4/2013 | Kuroda | B62D 5/0481 |
| | | | | 701/41 |
| 2014/0330471 | A1 | 11/2014 | Ozaki | |
| 2020/0039577 | A1* | 2/2020 | Kataoka | B62D 6/008 |
| 2020/0274437 | A1* | 8/2020 | Deguchi | H02M 1/32 |
| 2021/0157312 | A1* | 5/2021 | Cella | G01M 13/045 |

FOREIGN PATENT DOCUMENTS

| | | | |
|---|---|---|---|
| JP | 2012-019627 | 1/2012 | |
| JP | 2018-027012 | 2/2018 | |
| WO | 2013/016542 | 1/2013 | |
| WO | WO-2022176622 A1 * | 8/2022 | .............. B60L 3/003 |

OTHER PUBLICATIONS

International Search Report of PCT application No. PCT/JP2022/004004 dated Apr. 5, 2022.
Extended Supplementary European Search Report dated Jul. 12, 2024, issued in counterpart Application No. 22755943.2. (10 pages).

* cited by examiner

FAILURE PREDICTION SYSTEM, FAILURE PREDICTION METHOD, AND FAILURE PREDICTION PROGRAM

TECHNICAL FIELD

The present disclosure relates to a failure prediction system, a failure prediction method, and a failure prediction program which predict the failures due to aging in switching elements included in an inverter of an electric vehicle.

BACKGROUND ART

Electric vehicles (EV) are becoming more widespread, especially for commercial vehicles such as delivery vehicles. In recent years, EV travel data (battery information, movement paths, vehicle control information, and the like) is stored in the cloud, and environments in which such travel data can be used in many ways are being built.

In order for an EV to travel to the destination without running out of battery, various methods have been disclosed, such as calculating the required energy from the travel route and charging the required amount of charge. For example, a method has been proposed which notifies, when setting a destination, the optimum amount of charge required to travel the normally used route to reduce excessive charging and battery degradation (for example, Patent Literature (PTL) 1). Moreover, a method has been proposed which presents an optimal route to the destination with the lowest energy cost based on past travel history and determines whether the vehicle is capable of continuing to travel within the range of the amount of stored electricity (see, for example, PTL 2). In addition, a method has been proposed in which an inverter performs control which enables travel to the destination based on conditions, such as total mileage, weight, size, drag coefficient, speed, acceleration, history, temperature, and terrain (for example, see PTL 3).

An EV uses an inverter to drive a motor. Power elements used in inverters (for example, metal-oxide semiconductor field-effect transmitter (MOSFET), or insulated gate bipolar transistor (IGBT)) degrade over time. The power elements degrade mainly due to an increase in contact resistance of bonding wires. This is caused by metal fatigue due to heat cycles, and the increase in contact resistance of the bonding wires appears as an increase in loss (decrease in efficiency) of power elements.

CITATION LIST

Patent Literature

[PTL 1] Japanese Unexamined Patent Application Publication No. 2012-19627
[PTL 2] Japanese Unexamined Patent Application Publication No. 2009-63555
[PTL 3] Japanese Unexamined Patent Application Publication No. 2018-27012

SUMMARY OF INVENTION

Dedicated sensors are required to predict the degradation due to aging in respective elements other than the power elements, such as electrolytic capacitors, coils, and fans. Accordingly, in order to predict the degradation due to aging in those elements provided in EVs, it is necessary to change the design to add dedicated sensors.

On the other hand, the degradation due to aging in the power elements can be predicted without adding dedicated sensors if changes in increase of the loss can be predicted.

The present disclosure has been conceived in view of such circumstances. An object of the present disclosure is to provide a technique for predicting the degradation due to aging in a drive circuit of an electric vehicle at low cost.

In order to solve the above problem, a failure prediction system according to one aspect of the present disclosure includes: an obtainer which obtains travel data of an electric vehicle; and a predictor which predicts, based on the travel data of the electric vehicle, a failure due to aging in a drive circuit of a motor which drives a driving wheel of the electric vehicle. The travel data includes position data of the electric vehicle and data relating to power consumption of the electric vehicle. The predictor predicts the failure due to aging in the drive circuit based on a change in an increase of power consumption amount generated when the electric vehicle travels a same route.

It should be noted that any combination of the above-described structural elements and results of conversion of the representation of the present disclosure between devices, systems, methods, computer programs, recording media storing the computer programs, and the like are also effective as aspects of the present disclosure.

According to the present disclosure, it is possible to predict the degradation due to aging in a drive circuit of an electric vehicle at low cost.

BRIEF DESCRIPTION OF THE DRAWINGS

FIC. 6F illustrates specific examples of vehicle patterns generated when traveling the target route.

DESCRIPTION OF EMBODIMENT

Figure 1:
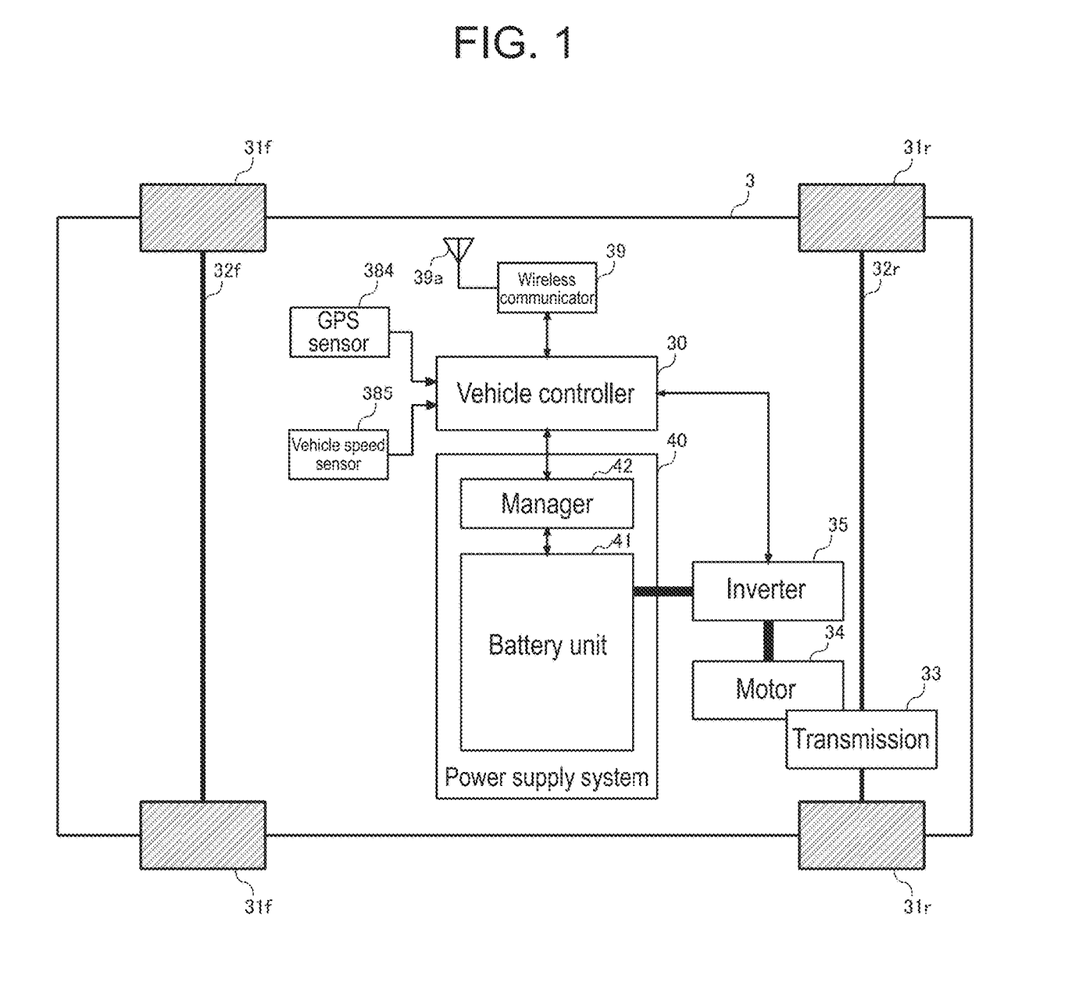
FIG. 1 illustrates a schematic configuration of an electric vehicle according to an embodiment.

FIG. 1 illustrates a schematic configuration of electric vehicle 3 according to an embodiment. In the present embodiment, electric vehicle 3 is assumed to be a pure EV without an internal combustion engine. Electric vehicle 3 illustrated in FIG. 1 is a rear-wheel drive (2WD) EV including a pair of front wheels 31f, a pair of rear wheels 31r, and motor 34 as a power source. A pair of front wheels 31f are connected by front axle 32f, and a pair of rear wheels 31r are connected by rear axle 32r. Transmission 33 transmits the rotation of motor 34 to rear axle 32r at a predetermined conversion ratio. Note that electric vehicle 3 may be a front-wheel drive (2WD) or a four-wheel drive (4WD) electric vehicle.

Power supply system 40 includes battery unit 41 and manager 42, and battery unit 41 includes a plurality of cells. Lithium-ion battery cells, nickel-metal hydride battery cells, and the like can be used for the cells. Hereinafter, in the description, an example is assumed in which lithium-ion battery cells (nominal voltage: 3.6-3.7V) are used. Manager 42 monitors the voltage, temperature, current, state of charge (SOC), and state of health (SOH) of each of the cells included in battery unit 41, and transmits the data to vehicle controller 30 via an in-vehicle network. Examples of the in-vehicle network include controller area network (CAN) and local interconnect network (LIN).

Inverter 35 is a drive circuit which drives motor 34. Inverter 35 converts the direct current (DC) power supplied from battery unit 41 into alternate current (AC) power, and supplies the converted power to motor 34 at power running. At regeneration, inverter 35 converts the AC power supplied from motor 34 into DC power, and supplies the converted power to battery unit 41. Motor 34 rotates according to the AC power supplied from inverter 35 at power running. At regeneration, motor 34 converts the rotational energy due to deceleration into AC power, and supplies the AC power to inverter 35.

Figure 2:
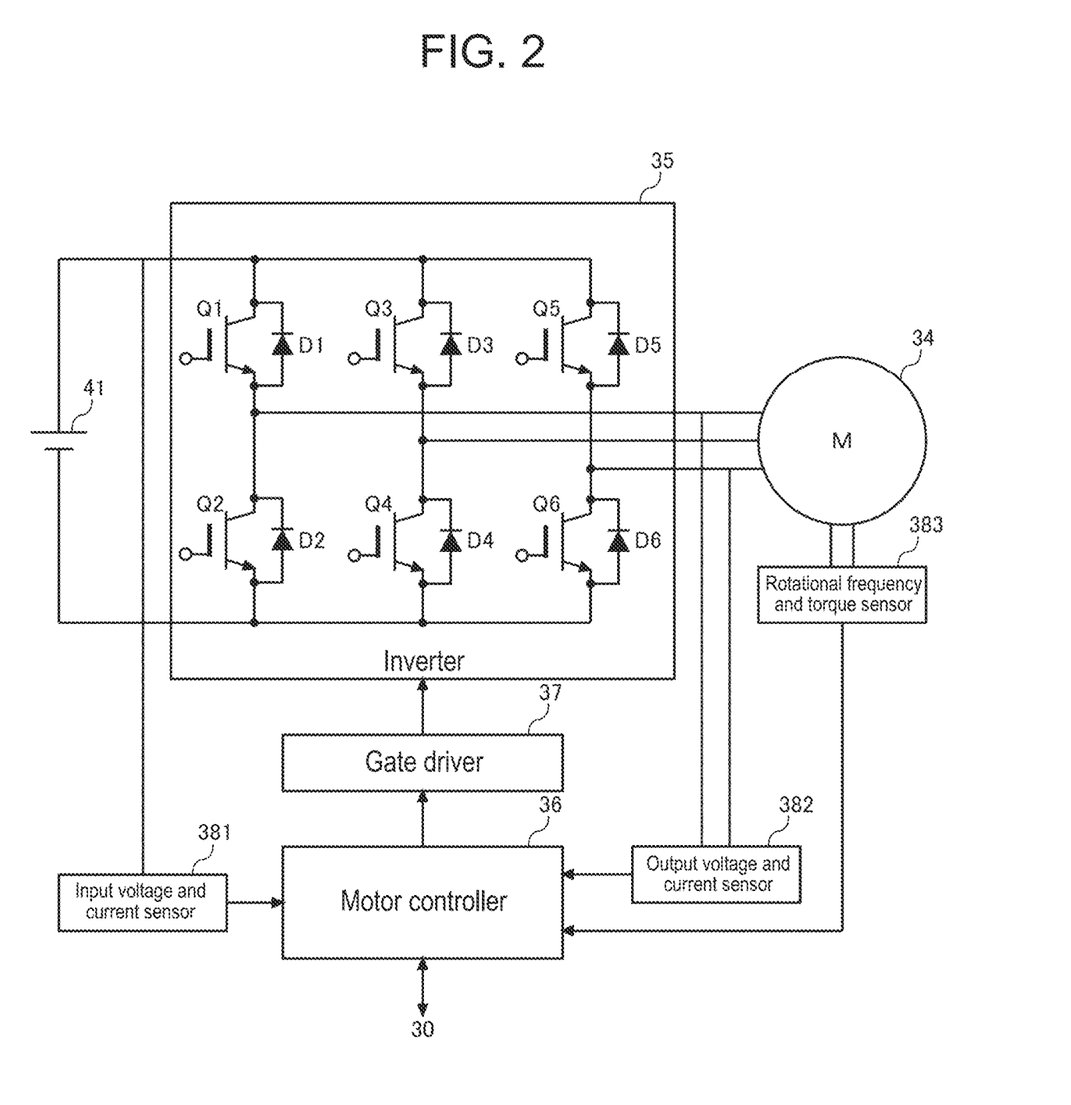
FIG. 2 illustrates a schematic configuration of a drive system of the electric vehicle.

FIG. 2 illustrates a schematic configuration of a drive system of electric vehicle 3. FIG. 2 illustrates an example in which a three-phase AC motor is used for motor 34 which drives electric vehicle 3, and three-phase AC motor 34 is driven by three-phase inverter 35. Three-phase inverter 35 converts the DC power supplied from battery unit 41 into three-phase AC power with a phase difference of 120 degrees, and drives three-phase AC motor 34.

Inverter 35 includes: a first arm in which first switching element Q1 and second switching element Q2 are connected in series; a second arm in which third switching element Q3 and fourth switching element Q4 are connected in series; and a third arm in which fifth switching element Q5 and sixth switching element Q6 are connected in series. The first to third arms are connected in parallel to battery unit 41.

In FIG. 2, an IGBT is used for each of first switching element Q1 to sixth switching element Q6. First diode D1 to sixth diode D6 are connected in anti-parallel to first switching element Q1 to sixth switching element Q6, respectively. When MOSFETs are used for first switching element Q1 to sixth switching element Q6, parasitic diodes each formed in the direction from the source to the drain are used for first diode D1 to sixth diode D6.

Motor controller 36 obtains the input DC voltage and input DC current of inverter 35 detected by input voltage and current sensor 381, the output AC voltage and output AC current of inverter 35 detected by output voltage and current sensor 382, and the rotational frequency and torque of three-phase AC motor 34 detected by rotational frequency and torque sensor 383. Motor controller 36 also obtains an acceleration signal or a brake signal according to the driver's operation or generated by an automatic driving controller.

Motor controller 36 generates a pulse-width modulation (PWM) signal for driving inverter 35 based on these input parameters, and outputs the generated PWM signal to gate driver 37. Gate driver 37 generates drive signals for first switching element Q1 to sixth switching element Q6 based on the PWM signal input from motor controller 36 and a predetermined carrier wave, and inputs the drive signals to the gate terminals of first switching element Q1 to switching element Q6.

Motor controller 36 transmits the input DC voltage of inverter 35, the input DC current of inverter 35, the rotational frequency of motor 34, and the torque of motor 34 to vehicle controller 30 via the in-vehicle network.

Now, description is made referring to FIG. 1 again. Vehicle controller is a vehicle electronic control unit (ECU) which controls entire electric vehicle 3, and may be configured with, for example, an integrated vehicle control module (VCM).

Global positioning system (GPS) sensor 384 detects position information of electric vehicle 3, and transmits the detected position information to vehicle controller 30. Specifically, GPS sensor 384 receives radio waves including respective transmission times from a plurality of GPS satellites, and calculates the latitude and longitude of the reception point based on the transmission times included in the received radio waves.

Vehicle speed sensor 385 generates a pulse signal proportional to the rotational frequency of front wheel axle 32f or rear wheel axle 32r, and transmits the generated pulse signal to vehicle controller 30. Vehicle controller 30 detects the speed of electric vehicle 3 based on the pulse signal received from vehicle speed sensor 385.

Wireless communicator 39 performs signal processing for wireless connection to the network via antenna 39a. Examples of the wireless communication network to which electric vehicle 3 can be wirelessly connected include a mobile phone network (cellular network), wireless LAN, vehicle-to-Infrastructure (V2I), vehicle-to-vehicle (V2V), electronic toll collection (ETC) system, and dedicated short range communications (DSRC).

While electric vehicle 3 is traveling, vehicle controller 30 is capable of transmitting the travel data in real time to the cloud server for data storage or in-house server using wireless communicator 39. The travel data includes position data (latitude and longitude) of electric vehicle 3, vehicle speed of electric vehicle 3, voltage, current, temperature, SOC, and SOH of each of the cells included in battery unit 41, input DC voltage and input DC current of inverter 35, and the rotational frequency and torque of motor 34. Vehicle controller 30 performs sampling on these data at regular intervals (for example, every 10 seconds), and transmits the data to the cloud server or in-house server after each sampling.

Note that vehicle controller 30 may store the travel data of electric vehicle 3 in an internal memory and collectively transmit the travel data stored in the memory at a predetermined timing. For example, vehicle controller 30 may collectively transmit the travel data stored in the memory to a terminal device at the office after the end of business for the day. The terminal device at the office transmits the travel data of electric vehicles 3 to the cloud server or in-house server at a predetermined timing.

In addition, when electric vehicle 3 is charged from a charger including a network communication function, vehicle controller 30 may collectively transmit the travel data stored in the memory to the charger via a charging cable. The charger transmits the received travel data to the cloud server or in-house server. This example is effective for electric vehicle 3 which does not include a wireless communication function.

Figure 3:
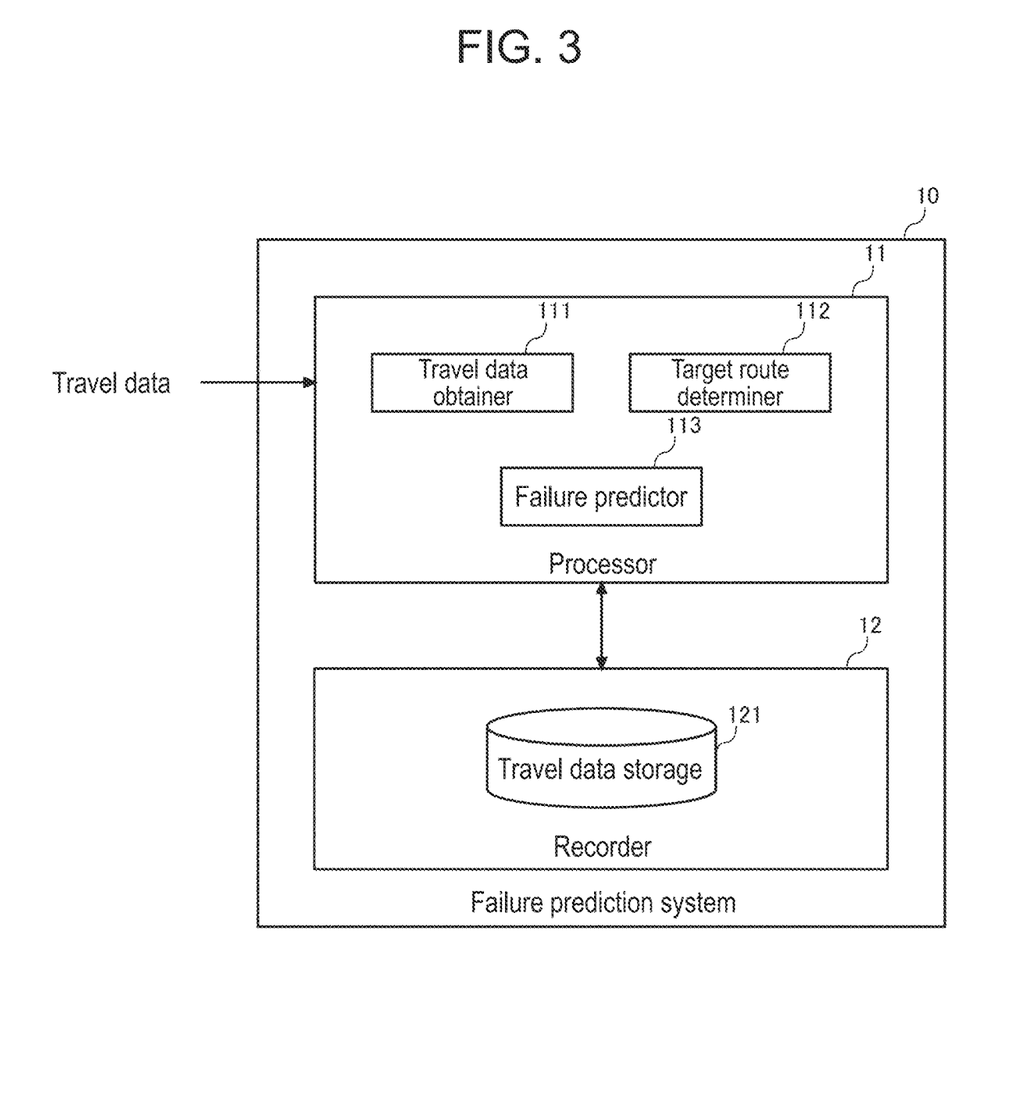
FIG. 3 illustrates a configuration example of a failure prediction system according to the embodiment.
Figure 4A:
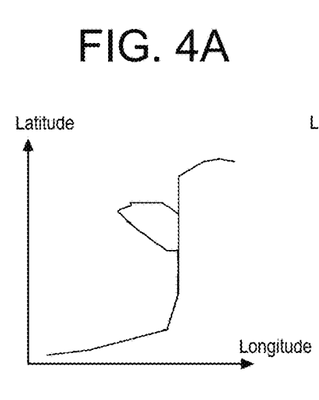
FIG. 4A illustrates GPS path obtained by dividing, by time, log data of GPS path of a given electric vehicle for a predetermined period.
Figure 4B:
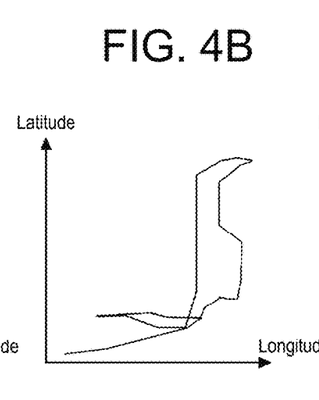
FIG. 4B illustrates GPS path obtained by dividing by time, log data of GPS path of a given electric vehicle for a predetermined period.
Figure 4C:
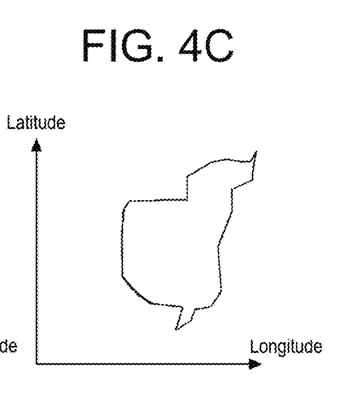
FIG. 4C illustrates GPS path obtained by dividing, by time, log data of GPS path of a given electric vehicle for a predetermined period.
Figure 4D:
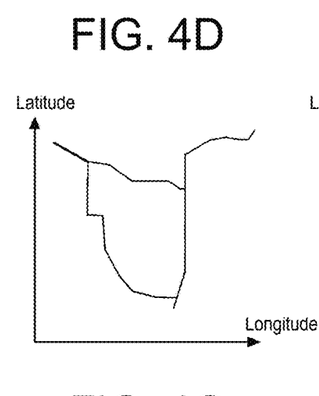
FIG. 4D illustrates GPS path obtained by dividing, by time, log data of GPS path of a given electric vehicle for a predetermined period.
Figure 4E:
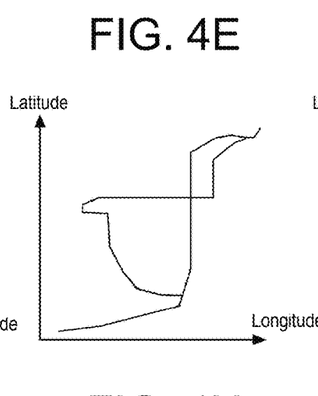
FIG. 4E illustrates GPS path obtained by dividing, by time, log data of GPS path of a given electric vehicle for a predetermined period.
Figure 4F:
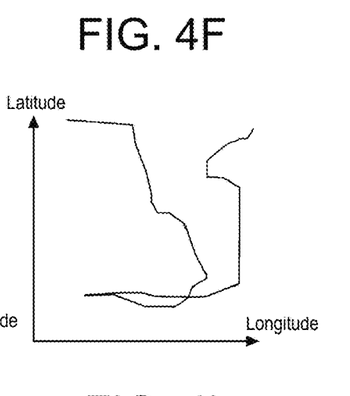
FIG. 4F illustrates GPS path obtained by dividing, by time, log data of GPS path of a given electric vehicle for a predetermined period.
Figure 4G:
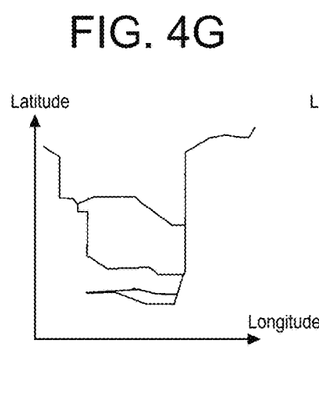
FIG. 4G illustrates GPS path obtained by dividing, by time log data of GPS path of a given electric vehicle for a predetermined period.
Figure 4H:
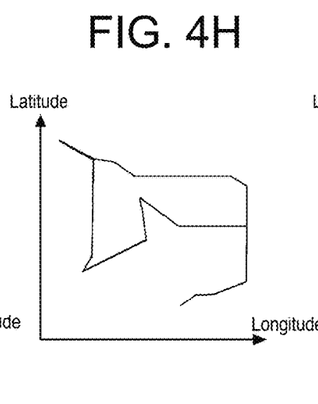
FIG. 4H illustrates GPS path obtained by dividing, by time, log data of GPS path of a given electric vehicle for a predetermined period.
Figure 4I:
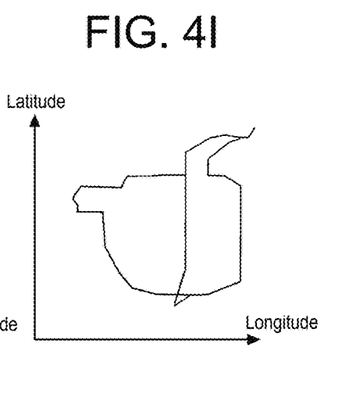
FIG. 4I illustrates GPS path obtained by dividing, by time, log data of GPS path of a given electric vehicle for a predetermined period.

FIG. 3 illustrates a configuration example of failure prediction system according to the embodiment. Failure prediction system 10 includes one or more servers. For example, failure prediction system 10 may include a single in-house server provided in a data center or in-house facility. Failure prediction system 10 may include a cloud server that is used based on a cloud service. Failure prediction system 10 may include a plurality of in-house servers distributed in a plurality of locations (data centers, in-house facilities). Failure prediction system 10 may include a combination of a cloud server that is used based on a cloud service and in-house server. Failure prediction system may include a plurality of cloud servers based on contracts with a plurality of cloud service providers.

Failure prediction system 10 includes processor 11 and recorder 12. Processor 11 includes travel data obtainer 111, target route determiner 112, and failure predictor 113. The functions of processor 11 can be realized by cooperation of hardware resources and software resources, or by hardware resources alone. Examples of the hardware resources that can be used include CPU, ROM, RAM, graphics processing unit (GPU), application specific integrated circuit (ASIC), field programmable gate array (FPGA), and other LSIs. Examples of the software resources that can be used include programs such as operating systems and applications.

Recorder 12 includes travel data storage 121. Recorder 12 includes non-volatile recording media, such as a hard disk drive (HDD) and a solid state drive (SSD), and records various data.

Travel data obtainer 111 obtains the travel data of electric vehicle 3 via the network, and stores the obtained travel data in travel data storage 121. Target route determiner 112 reads the travel data of electric vehicle 3 from travel data storage 121, and extracts the movement path of electric vehicle 3 from the changes in position data of electric vehicle 3. Target route determiner 112 determines a normally used route that is frequently used (hereinafter, referred to as a target route) based on the extracted movement path of electric vehicle 3.

FIGS. 4A to 4I plot GPS paths obtained by dividing, by time, log data of GPS path of given electric vehicle 3 for a predetermined period. In each of the examples illustrated in FIGS. 4A to 4I, the GPS path is simply plotted on a graph in which the horizontal axis is longitude and the vertical axis is latitude. The GPS path may be superimposed on the actual map and plotted.

Figure 5A:
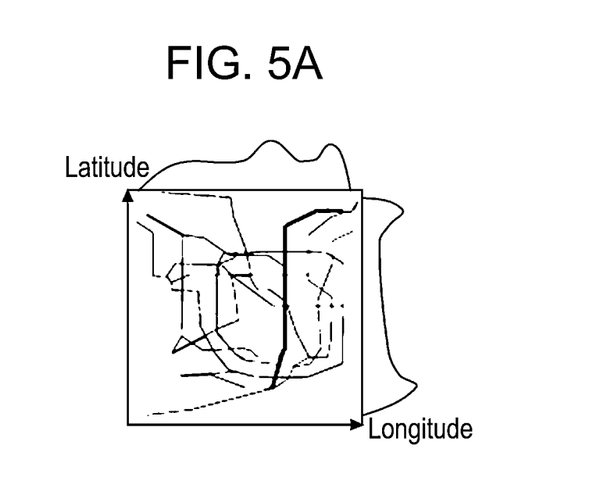
FIG. 5A is diagram for explaining a method of determining a target route.
Figure 5B:
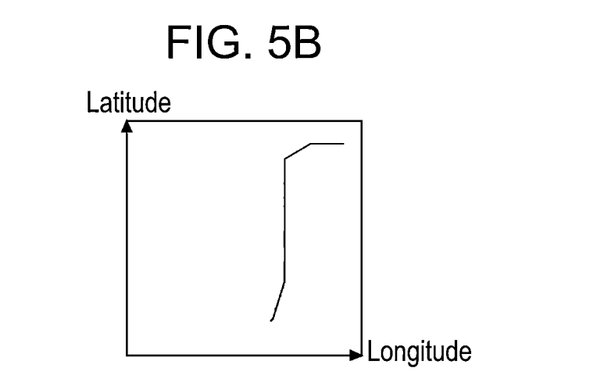
FIG. 5B is diagram for explaining a method of determining target route.
Figure 6A:
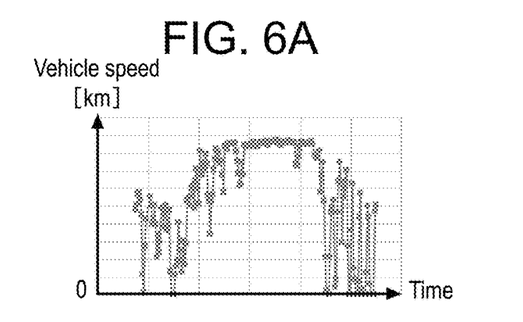
FIG. 6A illustrates specific examples of vehicle patterns generated when traveling the target route.
Figure 6B:
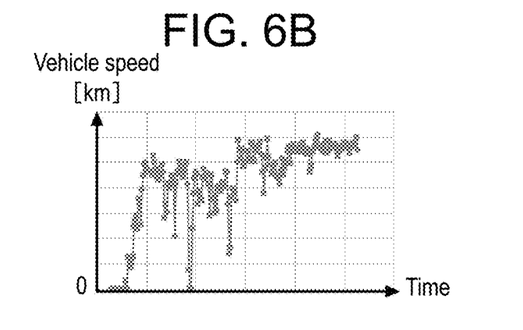
FIG. 6B illustrates specific examples of vehicle patterns generated when traveling the target route.
Figure 6C:
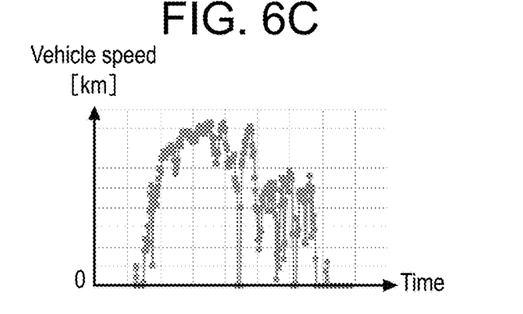
FIG. 6C illustrates specific examples of vehicle patterns generated when traveling the target route.
Figure 6D:
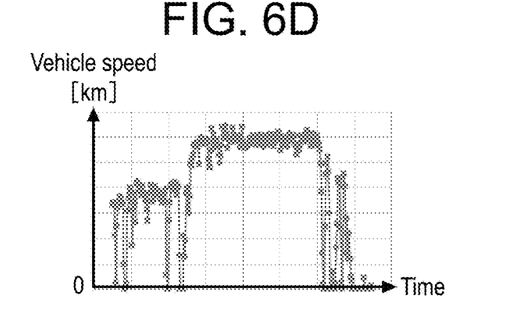
FIG. 6D illustrates specific examples of vehicle patterns generated when traveling the target route.
Figure 6E:
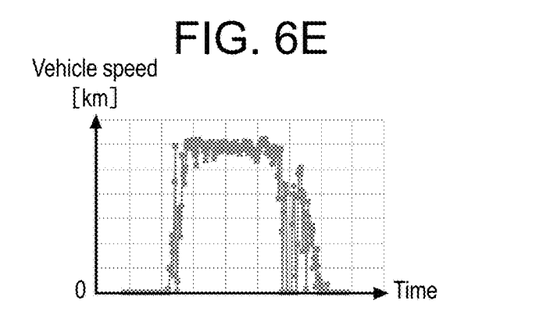
FIG. 6E illustrates specific examples of vehicle patterns generated when traveling the target route.
Figure 6F:
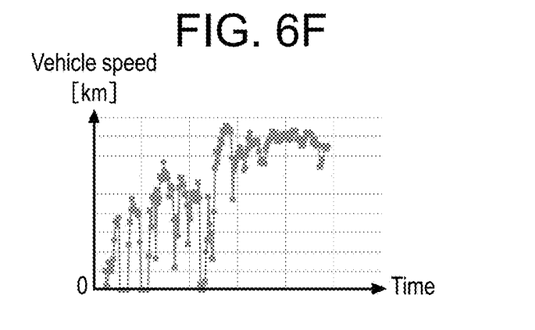
Figure 6G:
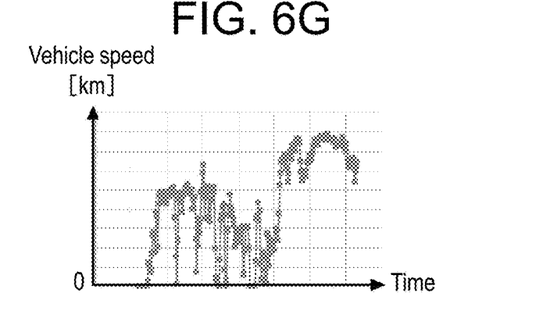
FIG. 6G illustrates specific examples of vehicle patterns generated when traveling the target route.

In FIGS. 5A and 5B are diagrams for explaining a method of determining a target route. In the example illustrated in FIG. 5A, target route determiner 112 generates a two-dimensional kernel density distribution (two-dimensional frequency distribution) based on the GPS path of electric vehicle 3 for a predetermined period. When generating a two-dimensional kernel density distribution, it is desirable to plot only the position data generated when the vehicle speed is greater than or equal to a set value (for example, 10 km/h). Plotting the position data generated when the vehicle is traveling at low speed or when the vehicle is stopped leads to a large number of plots. As a result, a density distribution deviating from the actual density distribution may be generated.

Target route determiner 112 generates a plotted latitudinal kernel density curve and a plotted longitudinal kernel density curve using a predetermined kernel function (for example, Gaussian function) and selecting a predetermined bandwidth. Target route determiner 112 identifies the highest peak position and the second highest peak position from the plotted latitudinal kernel density curve. In a similar manner, target route determiner 112 identifies the highest peak position and the second highest peak position from the plotted latitudinal kernel density curve. Target route determiner 112 determines the most frequently used route as the target route, among the routes that connect the intersection of the highest peak longitudinal position and the highest peak latitudinal position, and the intersection of the second highest peak longitudinal position and the second highest peak latitudinal position. FIG. 5B illustrates the target route determined by target route determiner 112 from the GPS path for the predetermined period illustrated in FIG. 5A.

The method of determining the target route is not limited to the method of determining the route based on the two-dimensional kernel density distribution. For example, target route determiner 112 may determine, as the target route, the route designated by an administrator who is familiar with the road conditions in the travel area of electric vehicle 3. As the target route, it is desirable to select a route in which the environmental conditions when electric vehicle 3 traveled stay as constant as possible. For example, it is desirable to select a route that is flat, has few curves, has few traffic lights, has little congestion, and is frequently used.

Failure predictor 113 reads a plurality of items of travel data generated when electric vehicle 3 traveled the target route from travel data storage 121, and generates changes in increase of power consumption amount generated during the traveling on the target route. Failure predictor 113 predicts the failures due to aging in switching elements Q1 to Q6 included in inverter 35, based on the changes in increase of the power consumption amount.

The degradation due to aging in switching elements Q1 to Q6 can be estimated from the increase in loss (efficiency decrease) of switching elements Q1 to Q6. In order to accurately predict the failure due to aging in inverter 35 from the changes in power consumption amount generated during the travel on the target route, it is desirable to exclude the influences of factors other than the factors of the increase in loss of inverter 35 as much as possible. First, it is desirable to use only data with similar vehicle speed patterns generated during the travel on the target route, as data to be analyzed.

In FIGS. 6A to 6G illustrate specific examples of vehicle speed patterns generated when traveling a target route. In FIGS. 6A to 6G illustrate seven vehicle speed patterns generated when traveling the target route. Failure predictor 113 extracts similar vehicle speed patterns from among the vehicle speed patterns generated when traveling the target route and extracted from the travel data. Various methods can be used to extract similar vehicle speed patterns. Examples of the method of the extraction include extracting the vehicle speed patterns each with a cumulative high-speed traveling time that is a predetermined period or longer (for example, extracting the vehicle speed patterns in each of which the traveling time at 50 km/h or higher is greater than or equal to half of the total traveling time), extracting the vehicle speed patterns each with the number of stops that is within a predetermined number, and extracting the vehicle speed patterns which have similar timing of stopping or acceleration and deceleration. Methods, such as pattern matching and correlation coefficients, may also be used. In the examples illustrated in FIGS. 6A to 6G, failure predictor 113 extracts the vehicle speed patterns in FIGS. 6A, 6D and 6E each with a cumulative high-speed traveling time that is a predetermined period or longer.

Failure predictor 113 extracts the SOC of battery unit 41 at the start point of the target route and the SOC of battery unit 41 at the end point of the target route from the travel data generated during the travel on the target route, to calculate power consumption amount generated during the travel on the target route based on the difference.

Failure predictor 113 also extracts the logs of input DC voltage V and input DC current I of inverter 35 from the start point to the end point of the target route from the travel data generated during the travel on the target route. Then, as in the following (Formula 1), failure predictor 113 is also capable of calculating the power consumption amount generated during the travel on the target route by integrating the input power of inverter 35 with the traveling time of the target route.

$$\text{Power consumption amount} = \int (V \cdot I) dt / 1000 \text{ [kWh]} \quad \text{(Formula 1)}$$

By dividing the distance of the target route by the calculated power consumption amount, the electricity consumption can be calculated. In addition to the loss of inverter 35 (mainly, loss due to the contact resistance of the bonding wires of switching elements Q1 to Q6), the power consumption amount calculated above takes into account the influences of the mechanical drive loss generated in the process of transmission of the rotational force of motor 34. The drive loss includes loss due to drive friction of the drive shaft, sliding friction of the differential gear, deformation of the rubber of a tire, friction between tires and road surface, and the like.

Failure predictor 113 is capable of calculating the integrated brake power generated during the travel on the target route by extracting, from the travel data, the logs of the rotational frequency rpm of motor 34 and the rotational torque Nm of motor 34 from the start point to the end point of the target route and by integrating the brake power of motor 34 with the traveling time of the target route, as indicated by the following (Formula 2).

$$\text{Integrated brake power} = \int (rpm \cdot Nm \cdot 2\pi/60) dt / 1000 \text{ [kWh]} \quad \text{(Formula 2)}$$

Failure predictor 113 is capable of calculating the power consumption amount from which the influences of the mechanical drive loss have been removed, by subtracting the integrated brake power calculated by (Formula 2) above from the power consumption amount calculated by (Formula 1) above.

The power consumption amount calculated by (Formula 1) above takes into account the influences of various variable factors in addition to the influences of loss of inverter 35 and mechanical drive loss. For example, the influences of weather, tire pressure, loaded weight, internal resistance of the batteries, vehicle speed (initial speed) at the start point of the target route, elevation difference of the target route, the number of stops while traveling the target route, etc. are taken into consideration. When the changes in elevation difference of the target route are greatly different between when electric vehicle 3 goes to the destination and when electric vehicle 3 comes back from the destination, the power consumption amount generated when going and the power consumption amount generated when coming back will be different values. The number of stops while traveling the target route influences the amount of regeneration to battery unit 41.

Figure 7:
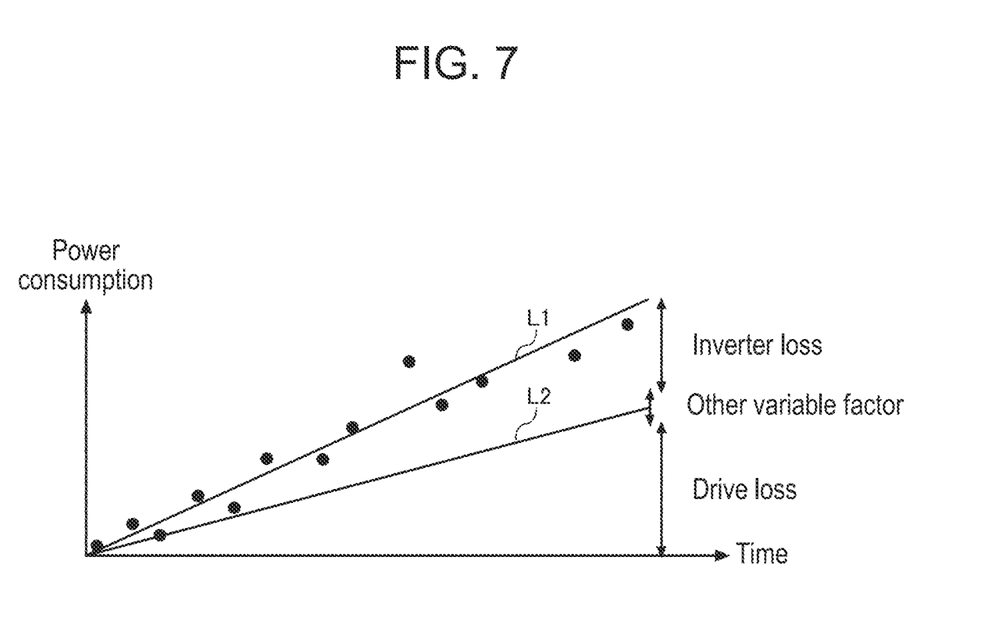
FIG. 7 illustrates an example of changes in power consumption amount generated when traveling a target route.

FIG. 7 illustrates an example of changes in power consumption amount generated when traveling a target route. The power consumption amount can be approximately explained by the sum of the power consumption due to the loss of inverter 35 and the power consumption amount due to the mechanical drive loss. Note that the power consumption amount is also influenced by other variable factors. Failure predictor 113 plots a plurality of power consumption amounts generated during the travel on the target route. Failure predictor 113 calculates first regression line L1 by a least squares method or the like based on the plotted power consumption amounts. Similarly, failure predictor 113 calculates second regression line L2 based on a plurality of integrated brake powers generated during the travel on the target route.

Assuming that the other variable factors stay constant, failure predictor 113 is capable of estimating the difference between first regression line L1 and second regression line L2 as the loss of inverter 35. Since first regression line L1 and second regression line L2 also extend in the future direction, failure predictor 113 is capable of predicting the future loss of inverter 35.

Failure predictor 113 is capable of predicting when the end of the statistical minimum life of inverter 35 will come, based on the predicted future loss of inverter 35. The administrator of electric vehicle 3 is capable of replacing inverter 35 as preventive maintenance before inverter 35 reaches the end of the statistical minimum life of inverter 35.

Failure predictor 113 is also capable of predicting when inverter 35 will reach the end of the statistical average life, based on the predicted future loss of inverter 35. The administrator of electric vehicle 3 is capable of replacing inverter 35 as preventive maintenance before inverter 35 reaches the end of the statistical average life. In that case, inverter 35 in use can be effectively utilized while minimizing downtime.

Failure predictor 113 is capable of applying various corrections to the power consumption amount in order to bring the other variable factors close to be constant. Processor 11 of failure prediction system 10 may include a weather information obtainer (not illustrated). The weather information obtainer obtains weather data for the time and date when electric vehicle 3 traveled the target route from a weather information database server on the network.

Failure predictor 113 may estimate the influence of the wind on the power consumption amount of electric vehicle 3 based on the direction of the wind, the air volume, and the direction of travel of electric vehicle 3, and correct the power consumption amount to standardize the influence. In addition, failure predictor 113 may estimate the friction coefficient of the road surface based on the amount of rainfall, estimate the influence of the friction coefficient of the road surface on the power consumption amount of electric vehicle 3, and correct the power consumption amount to standardize the influence.

Failure predictor 113 may also estimate the power consumption amount due to the use of an air conditioner based on the temperature, estimate the influence of the power consumption amount of the air conditioner on the power consumption amount of electric vehicle 3, and correct the power consumption amount to standardize the influence. When the power consumption amount is calculated from the input voltage and input current of inverter 35 instead of the SOC of battery unit 41, there is no need to consider the power consumption amount of the air conditioner.

When the travel data includes the log of a tire air pressure sensor, failure predictor 113 may estimate the influence of the tire air pressure on the power consumption amount of electric vehicle 3, and correct the power consumption amount to standardize the influence. When the travel data includes the log of a loaded weight sensor, failure predictor 113 may estimate the influence of the loaded weight on the power consumption amount of electric vehicle 3, and correct the power consumption amount to standardize the influence.

When the log of the loaded weight sensor is not included, failure predictor 113 may estimate the loaded weight based on the type of the delivery vehicle using electric vehicle 3. For example, when electric vehicle 3 is a pickup delivery vehicle, failure predictor 113 uses a loaded weight model in which the loaded weight increases from the morning pickup start time toward the evening pickup end time. When electric vehicle 3 is a delivery vehicle, failure predictor 113 uses a loaded weight model in which the loaded weight decreases from the morning delivery start time toward the evening delivery end time. When electric vehicle 3 is an inter-site delivery vehicle, failure predictor 113 estimates that the loaded weight does not change. Failure predictor 113 is capable of estimating the type of delivery vehicle from the electricity consumption for each time period.

Failure predictor 113 may estimate the influence of the initial speed at the target route on the power consumption amount of electric vehicle 3 based on the vehicle speed at the start point of the target route, and correct the power consumption amount to standardize the influence.

Failure predictor 113 may estimate the influence of the elevation difference of the target route on the power consumption amount generated when electric vehicle 3 goes to the destination and the power consumption amount generated when electric vehicle 3 comes back from the destination, and correct the power consumption amount to standardize the influence. Failure predictor 113 may extract only the power consumption amount generated when electric vehicle 3 goes to the destination or when electric vehicle 3 comes back from the destination from among a plurality of power consumption amounts generated during the travel on the target route, and estimate the changes in increase of the power consumption amount.

Depending on the method of calculating the power consumption amount, failure predictor 113 may subtract, based on the number of stops made during the travel on the target route, the regenerative power amount estimated from the number of stops from the power consumption amount. When the power consumption amount is calculated from the input voltage and input current of inverter 35 instead of the SOC of battery unit 41, there is no need to consider the regenerative power amount.

Failure predictor 113 may estimate the internal resistance of battery unit 41 based on the SOC, SOH, and temperature of battery unit 41, estimate the influence of the internal resistance of battery unit 41 on the power consumption amount of electric vehicle 3, and correct the power consumption amount to standardize the influence. When the power consumption amount is calculated from the input voltage and input current of inverter 35 instead of the SOC of battery unit 41, there is no need to consider the internal resistance of battery unit 41.

When the travel data includes the log of the driver, failure predictor 113 may extract only the power consumption amount generated by driving performed by the same driver from among a plurality of power consumption amounts generated during the travel on the target route, and estimate the changes in increase of the power consumption amount.

Figure 8:
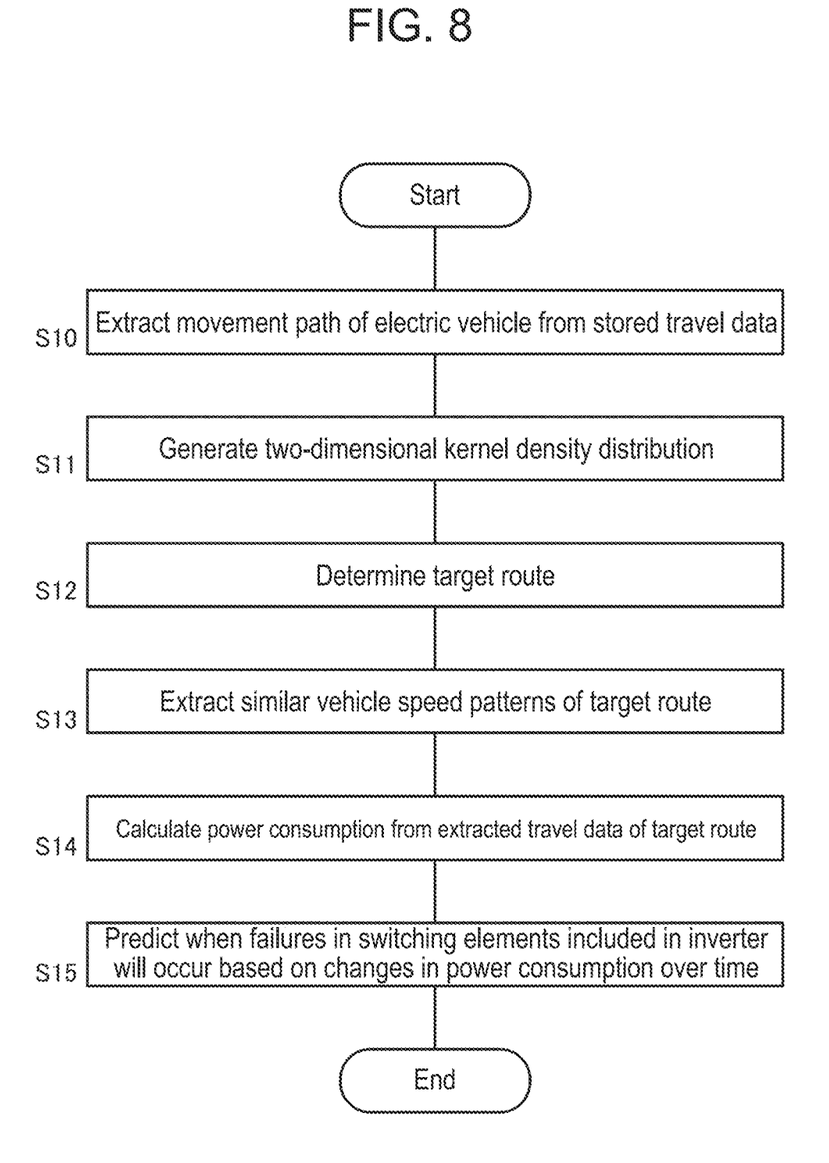
FIG. 8 is a flowchart illustrating a flow of a process for predicting the failure due to aging in a switching element included in an inverter performed by the failure prediction system according to the embodiment.

FIG. 8 is a flowchart illustrating a flow of a process for predicting the failures due to aging in switching elements Q1 to Q6 included in inverter 35 performed by failure prediction system 10 according to the embodiment. Target route determiner 112 reads the travel data of electric vehicle 3 from travel data storage 121, and extracts the movement path of electric vehicle 3 from the changes in position data of electric vehicle 3 (S10). Target route determiner 112 generates a two-dimensional kernel density distribution based on the movement path of electric vehicle 3 (S11). Target route determiner 112 determines the target route based on the generated two-dimensional kernel density distribution (S12). When the target route is determined without using the two-dimensional kernel density distribution, target route determiner 112 divides the movement path of electric vehicle 3 by time into predetermined periods as necessary.

Failure predictor 113 extracts similar vehicle speed patterns from among a plurality of vehicle speed patterns generated when electric vehicle 3 traveled the target route (S13). Failure predictor 113 calculates each power consumption amount generated during the travel on the target route from the travel data of the extracted vehicle speed patterns (S14). Failure predictor 113 predicts when the failures due to aging in switching elements Q1 to Q6 included in inverter 35 will occur, based on the changes in power consumption amount over time (S15).

As described above, according to the present embodiment, it is possible to predict the degradation due to aging in switching elements Q1 to Q6 included in inverter 35 of electric vehicle 3 at low cost. Obtaining and storing the travel data of electric vehicle 3 eliminates the need for addition of new components (for example, sensors for detecting the failures in switching elements Q1 to Q6) to electric vehicle 3. It is possible to accurately predict the failures in switching elements Q1 to Q6 at low cost simply by analyzing the log data.

By predicting the failures in switching elements Q1 to Q6 from the prediction of the increase in the loss of inverter 35 over time, it is possible to inform the user of the prediction in advance and prompt replacement and repair of inverter 35. This avoids the inconvenience of being unable to travel due to a sudden failure in inverter 35.

By estimating the changes in power consumption amount over time generated when the load conditions are approximately the same, it is possible to predict the failures in switching elements Q1 to Q6 in advance. In order to collect the power consumption amounts generated with approximately the same load conditions, the normally used target route that is frequently used is determined based on the two-dimensional kernel density distribution. Moreover, the value [kWh] obtained by multiplying the time integral of the brake power (torque×rotational frequency) of motor 34 by a predetermined coefficient is subtracted from the input power amount [kWh] of inverter 35. This makes it possible to eliminate the drive loss from the output shaft of motor 34 to the driving wheels (rear wheels 31*r*), and to assess only the increase in loss of inverter 35.

In addition, various other corrections eliminate the influences of various variable factors. For example, by estimating loaded weight changes from the temporal usage history of electric vehicle 3, the influences of the variable factor of the loaded weight can be eliminated. With these processes, it is possible to more accurately predict when the failures in switching elements Q1 to Q6 will occur than when predicting when the failures in switching elements Q1 to Q6 will occur based on the originally measured power consumption amount.

The present disclosure has been described above based on the embodiment. The embodiment is an example, and those skilled in the art will understand that various modifications can be made to a combination of the respective structural elements or the respective processes in the embodiment, and the modifications are also within the scope of the present disclosure.

In order to further improve the accuracy of the prediction of the increase in loss of inverter 35, the travel data in the sections of the GPS data where the sampling interval is greater than or equal to a predetermined period may be excluded from the data to be analyzed. For example, GPS data is often unavailable in the travel sections where there are many tunnels. Travel data on days with bad weather conditions (for example, snowy days) may also be excluded from the data to be analyzed.

Failure prediction system 10 according to the embodiment can also be used to predict when the failures in switching elements Q1 to Q6 included in inverter 35 provided in hybrid vehicles (HV) and plug-in hybrid vehicles (PHV) will occur. Of the motor-driven period and the engine-driven period, prediction can be made based on the travel data in the motor-driven period.

In the above-described embodiment, a four-wheel electric automobile using inverter 35 is assumed as electric vehicle 3. In this respect, electric vehicle 3 may be an electric motorcycle (electric scooter) or an electric bicycle. The electric automobiles include not only a full-standard electric automobile but also a low-speed electric automobile such as a golf cart or a land car used in a shopping mall or an entertainment facility.

The embodiment may be specified by the following items.

[Item 1] A failure prediction system (10) including:
an obtainer (111) which obtains travel data of an electric vehicle (3); and
a predictor (113) which predicts, based on the travel data of the electric vehicle (3), a failure due to aging in a drive circuit (35) of a motor (34) which drives a driving wheel (31R) of the electric vehicle (3),
wherein the travel data includes position data of the electric vehicle (3) and data relating to power consumption of the electric vehicle (3), and
the predictor (113) predicts the failure due to aging in the drive circuit (35) based on a change in an increase of power consumption amount generated when the electric vehicle (3) travels a same route.

With this, it is possible to predict the degradation due to aging in the drive circuit (35) at low cost.

[Item 2] The failure prediction system (10) according to item 1,
wherein the travel data includes a vehicle speed, and
the predictor (113) generates the change in the increase of the power consumption amount based on a plurality of items of the travel data which are similar in a vehicle speed pattern generated when the electric vehicle (3) travels the same route.

With this, it is possible to increase the prediction accuracy of the degradation due to aging in the drive circuit (35).

[Item 3] The failure prediction system (10) according to item 1 or item 2, wherein the travel data includes an input voltage of the drive circuit (35), an input current of the drive circuit (35), a rotational frequency of a motor (34) driven by the drive circuit (35), and a rotational torque of the motor (34), and the predictor (113) estimates loss of a switching element (Q1 to Q6) included in the drive circuit (35) by subtracting an integrated brake power of the motor (34) from power consumption, the integrated brake power of the motor (34) being obtained by integrating a brake power of the motor (34) that is based on the rotational frequency of the motor (34) and the rotational torque of the motor (34) with traveling time of the same route, the power consumption being obtained by integrating an input power of the drive circuit (35) that is based on the input voltage and the input current of the drive circuit (35) with the traveling time of the same route.

With this, it is possible to exclude the influences of the mechanical drive loss from the prediction of the degradation due to aging in the switching elements (Q1 to Q6) included in the drive circuit (35).

[Item 4] The failure prediction system (10) according to any one of items 1 to 3,
wherein the drive circuit (35) is an inverter (35), and
the predictor (113) predicts a failure due to aging in a switching element (Q1 to Q6) included in the inverter (35).

With this, it is possible to predict the degradation in the switching elements (Q1 to Q6) included in the inverter (35) at low cost.

[Item 5] The failure prediction system (10) according to any one of items 1 to 4, further including:
a route determiner (112) which extracts a movement path of the electric vehicle (3) from a change in the position data of the electric vehicle (3), generates a two-dimensional frequency distribution, and determines the same route.

With this, it is accurately determine a target route serving as a basis for sampling the power consumption.

[Item 6] The failure prediction system (10) according to item 5, wherein the two-dimensional frequency distribution generated by the route determiner (112) is a two-dimensional kernel density distribution.

With this, it is possible to accurately determine the target route serving as a basis for sampling the power consumption, based on density functions.

[Item 7] The failure prediction system (10) according to item 5, wherein the route determiner (112) identifies a target route that is used frequently, based on the movement path of the electric vehicle (3) extracted, and the predictor (113) predicts the failure due to aging in the drive circuit (35) based on a change in an increase of power consumption generated when the electric vehicle (3) travels the target route.

With this, it is possible to predict the degradation due to aging in the drive circuit (35) based on the accurate travel data of the target route at low cost.

[Item 8] The failure prediction system (10) according to item 5 or item 6, wherein the travel data includes a vehicle speed, and the route determiner (112) generates the two-dimensional frequency distribution by excluding position data of the electric vehicle (3) generated when the vehicle speed is less than a set value.

With this, it is possible to accurately generate the two dimensional frequency distribution.

[Item 9] A method of predicting a failure, including:
obtaining travel data of an electric vehicle (3); and
predicting, based on the travel data of the electric vehicle (3), a failure due to aging in a drive circuit (35) of a motor (34) which drives a driving wheel (31R) of the electric vehicle (3),
wherein the travel data includes position data of the electric vehicle (3) and data relating to power consumption of the electric vehicle (3), and
in the predicting, the failure due to aging in the drive circuit (35) is predicted based on a change in an increase of power consumption generated when the electric vehicle (3) travels a same route.

With this, it is possible to predict the degradation due to aging in the drive circuit (35) at low cost.

[Item 10] A failure prediction program for causing a computer to execute:
obtaining travel data of an electric vehicle (3); and
predicting, based on the travel data of the electric vehicle (3), a failure due to aging in a drive circuit (35) of a motor (34) which drives a driving wheel (31R) of the electric vehicle (3),
wherein the travel data includes position data of the electric vehicle (3) and data relating to power consumption of the electric vehicle (3), and
in the predicting, the failure due to aging in the drive circuit (35) is predicted based on a change in an increase of power consumption generated when the electric vehicle (3) travels a same route.

With this, it is possible to predict the degradation due to aging in the drive circuit (35) at low cost.

REFERENCE MARKS IN THE DRAWINGS 3 electric vehicle
10 failure prediction system
11 processor
111 travel data obtainer
112 target route determiner
113 failure predictor
12 recorder
121 travel data storage
30 vehicle controller
31f front wheel
31r rear wheel
32f front axle
32r rear axle
33 transmission
34 motor
35 inverter
36 motor controller
37 gate driver
381 input voltage and current sensor
382 output voltage and current sensor
383 rotational frequency and torque sensor
384 GPS sensor
385 vehicle speed sensor
39 wireless communicator
39a antenna
40 power supply system
41 battery unit
42 manager
Q1 to Q6 switching element
D1 to D6 diode

The invention claimed is:

1. A failure prediction system comprising:
an obtainer which obtains travel data of an electric vehicle; and
a predictor which predicts, based on the travel data of the electric vehicle, a failure due to aging in a drive circuit of a motor which drives a driving wheel of the electric vehicle,
wherein the travel data includes position data of the electric vehicle and data relating to power consumption of the electric vehicle, and
the predictor predicts the failure due to aging in the drive circuit based on a change in an increase of power consumption amount generated when the electric vehicle travels a same route.

2. The failure prediction system according to claim 1, wherein the travel data includes a vehicle speed of the electric vehicle, and
the predictor generates the change in the increase of the power consumption amount based on a plurality of items of the travel data which are similar in a vehicle speed pattern generated when the electric vehicle travels the same route.

3. The failure prediction system according to claim 1, wherein the travel data includes an input voltage of the drive circuit, an input current of the drive circuit, a rotational frequency of a motor driven by the drive circuit, and a rotational torque of the motor, and
the predictor estimates loss of a switching element included in the drive circuit by subtracting an integrated brake power of the motor from power consumption amount, the integrated brake power of the motor being obtained by integrating a brake power of the motor that is based on the rotational frequency of the motor and the rotational torque of the motor with traveling time of the same route, the power consumption being obtained by integrating an input power of the drive circuit that is based on the input voltage and the input current of the drive circuit with the traveling time of the same route.

4. The failure prediction system according to claim 1, wherein the drive circuit is an inverter, and
the predictor predicts a failure due to aging in a switching element included in the inverter.

5. The failure prediction system according to claim 1, further comprising:
a route determiner which extracts a movement path of the electric vehicle from a change in the position data of the electric vehicle, generates a two-dimensional frequency distribution, and determines the same route.

6. The failure prediction system according to claim 5, wherein the two-dimensional frequency distribution generated by the route determiner is a two-dimensional kernel density distribution.

7. The failure prediction system according to claim 5, wherein the route determiner identifies a target route that is used frequently, based on the movement path of the electric vehicle extracted, and the predictor predicts the failure due to aging in the drive circuit based on a change in an increase of power consumption amount generated when the electric vehicle travels the target route.

8. The failure prediction system according to claim 5, wherein the travel data includes a vehicle speed of the electric vehicle, and
the route determiner generates the two-dimensional frequency distribution by excluding position data of the electric vehicle generated when the vehicle speed is less than a set value.

9. A method of predicting a failure, comprising:
obtaining travel data of an electric vehicle; and
predicting, based on the travel data of the electric vehicle, a failure due to aging in a drive circuit of a motor which drives a driving wheel of the electric vehicle,
wherein the travel data includes position data of the electric vehicle and data relating to power consumption of the electric vehicle, and
in the predicting, the failure due to aging in the drive circuit is predicted based on a change in an increase of power consumption amount generated when the electric vehicle travels a same route.

10. A non-transitory machine-readable recording medium that stores a failure prediction program for causing a computer to execute:
obtaining travel data of an electric vehicle; and
predicting, based on the travel data of the electric vehicle, a failure due to aging in a drive circuit of a motor which drives a driving wheel of the electric vehicle,
wherein the travel data includes position data of the electric vehicle and data relating to power consumption of the electric vehicle, and
in the predicting, the failure due to aging in the drive circuit is predicted based on a change in an increase of power consumption amount generated when the electric vehicle travels a same route.

* * * * *